United States Patent
Dryon

[15] 3,704,642
[45] Dec. 5, 1972

[54] APPARATUS FOR INCISING A WEB OF GLASS

[72] Inventor: Jacques Max Charles Dryon, Auvelais, Belgium

[73] Assignee: Ateliers Heuze, Malevez & Simon Reunis, Societe Anonyme, Auvelais, Belgium

[22] Filed: Oct. 16, 1970

[21] Appl. No.: 81,376

[30] Foreign Application Priority Data

Dec. 8, 1969 Belgium....................................82479

[52] U.S. Cl. ............................83/11, 83/12, 83/295, 83/326
[51] Int. Cl. ................................................B26d 3/08
[58] Field of Search............83/6, 7, 11, 12, 295, 326, 83/353; 225/96.5; 33/32 B

[56] References Cited

UNITED STATES PATENTS 3,439,849 4/1969 Matsuzaki et al.....................83/11 X Primary Examiner—James M. Meister
Attorney—Waters, Roditi, Schwartz & Nissen

[57] ABSTRACT

An apparatus for incising an advancing glass web passed continuously upon horizontal transporter means. The apparatus comprises a beam extending across the web and defining a closed loop path, upon which a carriage having incising tools is movably supported. An elongated coil, subdivided into different sections independently energizable to generate respective section eddy currents is fixed along the beam. Eddy currents are generated in part of the carriage, and the motion of the carriage derives from the reaction between magnetic fields of the carriage and the coils. The carriage is deviable toward and away from the glass web during its movement around the beam, so that the incising tool is lowered on to the glass web during the incision stroke and lifted therefrom on its return stroke.

7 Claims, 3 Drawing Figures

PATENTED DEC 5 1972 3,704,642

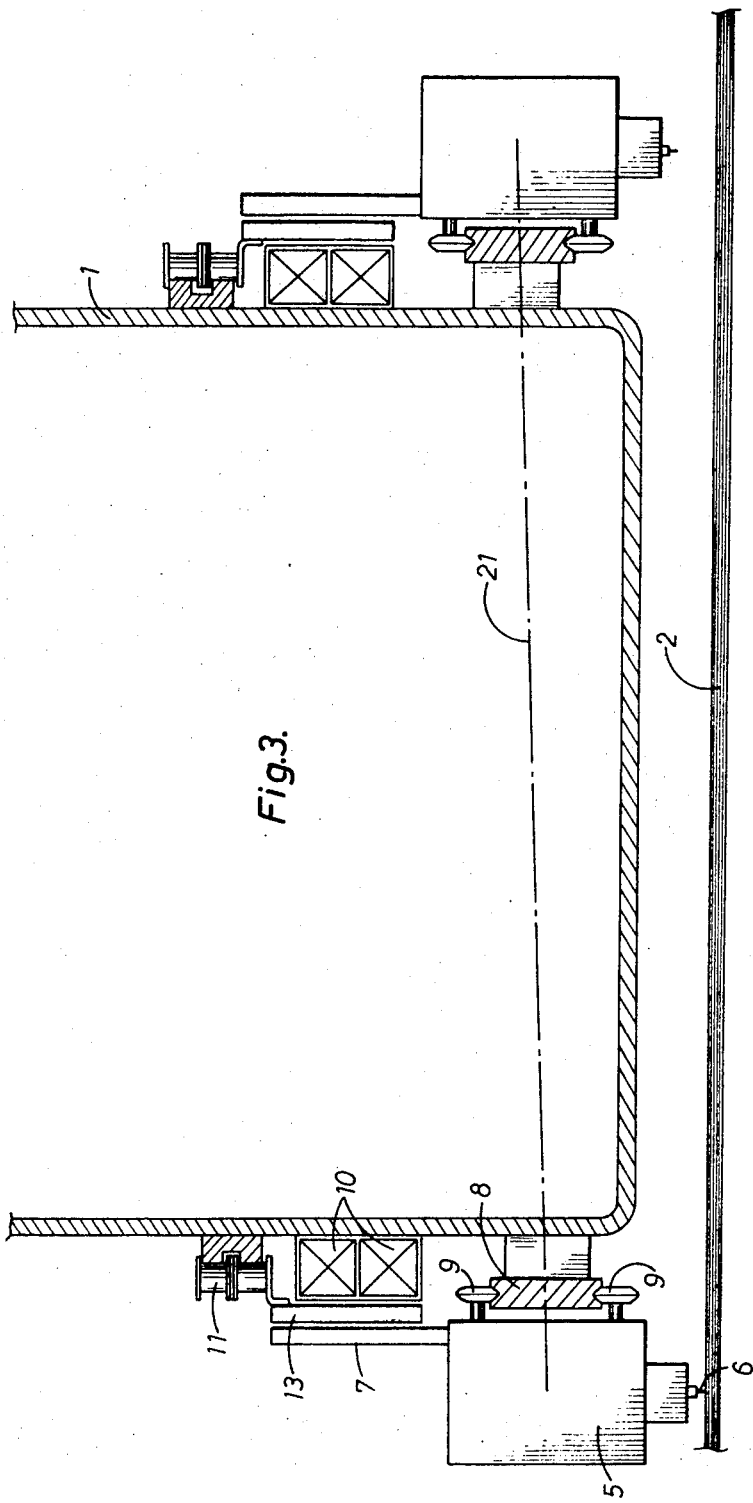

APPARATUS FOR INCISING A WEB OF GLASS

The present invention relates to an apparatus for incising an advancing web of glass.

The incised web is then passed to severing apparatus for cutting in accordance with the incisions.

In conventional incision apparatus, producing in each operation a single priming line, the incising implement is generally mounted on a carriage movable across the glass web on a horizontal beam. In some cases this beam, which is ranged at right angles to the median axis of the glass web, is movable during the priming operation along the glass web at a speed equal to that of the web, to return after one or more incisions to its starting point. In other cases the beam is not movable, but, in order to obtain priming lines normal to the median axis of the glass web, it is disposed obliquely to the axis. In order to adapt apparatus with an oblique beam to the speed of the glass web, the angle of the beam may be varied if the speed of the incising implement is fixed, or the speed of the incising tool may be varied if it is preferred to fix the beam at a given angle which does not vary.

Such apparatus presents the disadvantage that the incising tool or the movable beam may not be returned to their respective starting points when a signal ordering a new course of incision arrives. This disadvantage is all the more serious since the speed of transport of the glass web is ever increasing, as is its width, which at present already reaches 3 to 4 meters. Attempts have been made to remove this disadvantage by providing on the beam several rolling tracks, parallel to the beam axis, on each of which a corresponding carriage carrying an incising tool is reciprocable. Thus one of the carriages can be chosen to receive the signal initiating a priming run. Alternatively, carriages on several beams can receive this signal simultaneously. It is thus possible to form narrowly space priming lines, for example to remove portions of the web that contain flaws. This duplication of carriages or of the beams mounting the carriages makes the incision apparatus more expensive to buy and maintain however, and more complicated to use. In fact, the starting point differs from carriage to carriage or from beam to beam, and this must be taken into account in issuing the starting signal. If the signal is issued by an electronic control, instructed to choose between several cutting programmes stored in a memory to cut down the wastage of glass due to the flaws in the web whose co-ordinates have been conjugated and fed into a computer, the latter's jobs are obviously considerably increased if it must additionally take into account the different co-ordinates of every incising tool or of each beam crossing the glass web.

In accordance with the invention, apparatus for incising an advancing glass web comprises a beam extending across the web and on which is mounted a carriage movable to and fro across the web by eddy currents generated in a closed circuit extending across the beam, the carriage carrying an incising tool performing an incision stroke on a first run across the beam and being returned to a start position during a second run back across the beam during which the tool is raised from the web.

The carriage is preferably movable around a closed loop path extending across the beam and defining the first and second runs on opposite loop sides. The closed loop path is suitably defined by a guide rail supporting the carriage.

The closed circuit preferably comprises an elongate coil extending across the beam, running parallel to the closed loop path and divided into sections independently energizable to generate respective section eddy currents.

Preferably, the carriage carries an armature plate and an endless belt loop running parallel to the coil carries coupling plates arranged to lie parallel to the armature plate of the carriage as they move past the carriage and between the armature plate and the coil, whereby on energization of the coil section adjacent the carriage the armature plate is magnetically coupled to a coupling plate to entrain the carriage at substantially the same speed as the belt, whose speed is proportional to that of the advancing web. The endless belt loop suitably comprises a chain.

The path of the carriage may lie in a plane inclined to that of the advancing web so that the incising tool is lowered on to the web for an incision stroke and lifted therefrom on its return stroke.

The elongate coil preferably comprises: a first section whose length is substantially equal to that of a carriage and is provided with a supply lead energized when commanded by an electronical signal at the start point for an incising run; a second section comprising a straight out run across the beam from the start station, a 180° turn section and serving for braking the carriages to transfer it at very low speed under the fourth section which is contiguous to the first section and under low voltage, suitable for advancing the waiting carriages and for thrusting the first carriage in the first section when the carriage intended to effect the next incising run has started off.

The carriage is preferably one of a set of carriages mounted in series on the beam and successively movable across the beam to perform successive incision strokes.

The invention will now be described in more detail, by way of example only, with reference to the accompanying diagrammatic drawings, in which:

FIG. 3 is a cross-section through a beam of the apparatus.

The accompanying drawings show, by way of example, an embodiment with a fixed beam oblique to the median axis of the advancing glass web, but it will be appreciated that the invention is equally applicable to movable beams, adapted to be moved at the speed of progress of the glass web.

Figure 1:
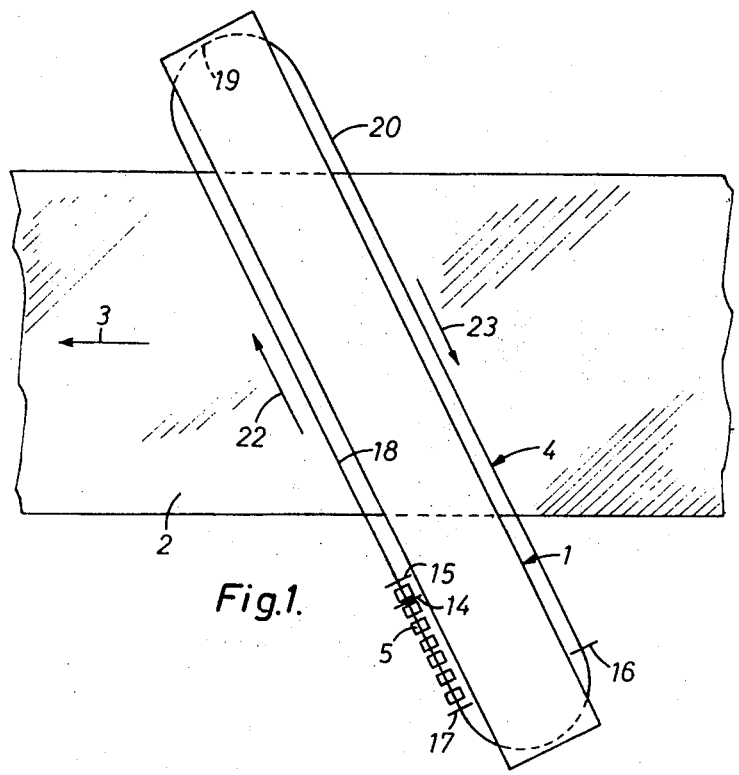
FIG. 1 is a diagrammatic plan view of apparatus for incising an advancing web of glass.
Figure 2:
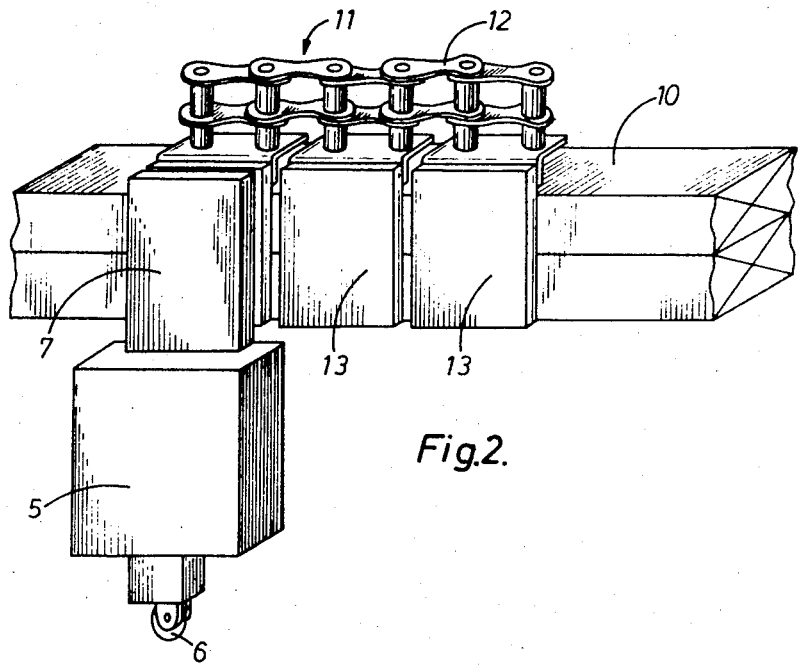
FIG. 2 shows part of the apparatus in perspective.

Referring to FIG. 1, on a beam 1 ranged obliquely across a glass web 2 moving in the sense of an arrow 3, defines a closed loop path 4 along which carriages 5 can be successively moved, each carriage being equipped with an incising tool 6 and an armature plate 7 of soft iron, as shown in FIG. 2.

Referring to FIG. 3, the closed loop means consists of a guide rail 8, on which roll castors 9 of the carriages 5. Fixed elongate coils 10 defining different sections along the beams are, adapted to generate eddy currents when energized and constituting the stator windings of a linear electric motor are mounted above the rail 8. An endless belt in the form of a chain 11 is driven by a transmission system (not shown) in continuous motion along the closed path at a speed according to that of the progress of the glass web, so that, for a given angle of obliquity the beam 1, the incision line shall be normal to the median axis of the glass web. To each links 12 of the chain are fixed soft iron coupling plate 13 which fits between the plate 7 of the carriage and the coils 10 without material contact, as shown in perspective in FIG. 2.

The coils 10 are subdivided into sections indicated in FIG. 1 by division lines 14 to 17. The first section between the lines 14 and 15 is very short having the length of a carriage 5. The energizing of this section is effected by an electronic control signal from a computer (not shown). This signal can be duplicated by a manual device selectively operable for example when the glass web appears with an irregular leading edge, to order a first priming stroke. This serves as a starting point for computing the length of the advanced web and determining the co-ordinates of any flaws in it. This signal commands the launching of the carriage arrested in the first section into an incision stroke. The second section of the coils, lying between the lines 15 and 16, comprises a straight run 18, a curved portion 19 and the straight return run 20 of the path, defining the incision and return strokes of the carriages. The third section of the coils, between the lines 16 and 17, serves for braking the carriages so as to bring them to the fourth section of the coils between lines 17 and 14 at a decreasing speed. The fourth section, between the lines 17 and 14, is supplied with a low voltage just sufficient to move the row of carriages to the waiting stage and to push the first carriage of the row on to the first section, once the carriage stationed there has moved off.

The closed path mounted on the beam 1 extends in a plane 21 (FIG. 3) which is gently inclined with respect to that of the glass web 2, so that during the incision run in the direction of arrow 22 (FIG. 1) the incising tool 6 (FIG. 3) is applied to the glass web, and during the return run (arrow 23) the tool 6 is raised.

The intensity of the eddy currents provided by the coils 10 is a function of the voltage driving continuous current through the various sections of the coils 10. The eddy currents magnetically couple the armature plate 7 of a carriage to a coupling plate 13 of the endless chain 11 and force the carriage to move in a sense which depends on the polarity of the current energizing the coils. The effective speed of movement of the chain 11, is regulated to the speed of the glass web 2. In order to avoid any perceptible slip between the plates 7 and 13 in the parts 18, 19 and 20 of the closed path, the voltage of the current supplied to the coils of this section comprised between the lines 15 and 16 is so chosen as to make the speed of movement of the plate 7 produced by the eddy currents substantially equal to that of the endless chain 11.

In the short section between the lines 14 and 15 the coils must be supplied with a current at a voltage higher than the coils between the lines 15 and 16, so as to impart to the carriage a starting velocity and an acceleration such as to bring it up to the constant speed of incision at the moment the tool reaches the edge of the glass web.

The coils of the section between the lines 16 and 17 must be supplied with a current of reversed polarity to produce in the second curved portion of the path a considerable retardation of the carriages so that they pass at a very low speed under the coils of the waiting section between the lines 17 and 14. The coils of this latter section may be supplied with a low voltage of normal polarity, allowing the carriages to move forward and the first carriage to pass on to the waiting station in the launching section, once the carriage stationed there has been set in motion. In the waiting section a considerable slip between the plates 7 and 13 is inevitable, but is of no consequence.

Apparatus such as just described, producing one incision line per operation, enables very closely spaced incision lines to be made, regardless of the transport speed and width of the glass web. Consequently the apparatus is equally suitable for systems with a movable beam, adapted to be translated parallel to itself, and such with a fixed beam, disposed obliquely to the median axis of the glass web.

I claim:

1. An apparatus for incising an advancing glass web, comprising: a beam extending across the glass web defining a closed loop path; a carriage movably supported on the beam, deviable toward and away from the glass web during its movement along the closed loop path, having at least an incising tool at one end and at least an armature plate at the opposite end, said incising tool being engageable with said glass web for performing an incision stroke on a first run, across the glass web and disengageable from said glass web during a second run back across the glass web; closed loop means fixed upon the beam for supporting the carriage; means for driving the carriage upon said closed loop means, said means being formed by a closed circuit extending across the glass web having an elongated coil, running parallel to said closed loop means and divided into sections independently energizable, to generate respective section eddy currents, and an endless belt loop running parallel to the coil, carrying coupling plates arranged to lie parallel between the armature plate and the coil, said coil being adapted to generate eddy currents upon energization of the coil section, adjacent the carriage so that the armature plate is magnetically coupled to the coupling plate to move the carriage at substantially the same speed as the belt loop, during the incising run.

2. The apparatus as defined in claim 10, wherein the carriage is movable around the closed loop means extending across the glass web and performing the first and second runs on opposite loop sides.

3. The apparatus as defined in claim 11, wherein the closed loop means comprises a guide rail supporting the carriage.

4. The apparatus as defined in claim 10, wherein the endless belt loop comprises a chain movable in a continuous motion along the closed circuit, at a speed dependent upon that of the advancing glass web.

5. The apparatus as defined in claim 12, wherein the guide rail lies in a plane inclined to that of the advancing glass web so that the incision tool is lowered on to the glass web for the incision stroke and lifted therefrom on its return stroke.

6. The apparatus as defined in claim 10, wherein the elongated coil comprises, a first section whose length is substantially equal to the length of the carriage and which provides a starting station, a second section comprising a straight out run along the beam from the starting station; a 180° turn section at one end of the beam, and a straight return back along the beam; a third section comprising a 180° turn section at the opposite end of the beam providing a deceleration station between the return run, and a fourth section which is a low voltage section for feeding the carriage on to the starting station.

7. The apparatus as defined in claim 10, wherein the carriage is one of a set of carriages mounted in series on the beam and successively movable along the closed loop path, each carriage having an incision tool and an armature plate aligned upon the closed circuit, each carriage being adapted to be set upon an incision run by a command signal when it finds itself at a point of the circuit defining the starting point, and being adapted to follow a preceding carriage for performing a line of incision distinct from that of the preceding carriage.

* * * * *